United States Patent [19]
Rodek et al.

[11] Patent Number: 5,633,090
[45] Date of Patent: May 27, 1997

[54] LEAD-AND CADMIUM-FREE GLASS COMPOSITION FOR GLAZING, ENAMELING AND DECORATING GLASS

[75] Inventors: Erich Rodek; Werner Kiefer; Friedrich Siebers, all of Mainz, Germany

[73] Assignee: Schott Glaswerke, Mainz, Germany

[21] Appl. No.: 265,989

[22] Filed: Jun. 27, 1994

Related U.S. Application Data

[63] Continuation of Ser. No. 29,364, Mar. 22, 1993, abandoned, which is a continuation-in-part of Ser. No. 2,351, Jan. 21, 1993, abandoned.

[51] Int. Cl.⁶ ............................................. C03C 8/02
[52] U.S. Cl. ........................ 428/428; 428/426; 501/14; 501/17; 501/65; 501/67; 501/69; 501/72
[58] Field of Search ............................. 428/426, 428, 428/212; 501/11, 14, 17, 21, 55, 65, 67, 69, 72

[56] References Cited

U.S. PATENT DOCUMENTS

| | | | |
|---|---|---|---|
| 4,361,654 | 11/1982 | Ohmura et al. | 501/21 |
| 4,970,178 | 11/1990 | Klimas et al. | 501/26 |
| 5,045,509 | 9/1991 | Kiefer | 501/59 |
| 5,091,345 | 2/1992 | Becker | 501/14 |

FOREIGN PATENT DOCUMENTS

| | | |
|---|---|---|
| 18559 | 4/1980 | European Pat. Off. . |
| 0131389 | 1/1985 | European Pat. Off. . |
| 324925 | 9/1975 | German Dem. Rep. . |
| 965018 | 7/1964 | United Kingdom . |
| 90/15782 | 12/1990 | WIPO . |

OTHER PUBLICATIONS

Epples, "Glazes and Enamels" Glass, Science and Technology vol, Chapter 4, 1983 pp. 301–336.
Chemical Abstracts 110, (1989) Mar. 20. No. 6.
Chemical Abstracts 110, (1989) Mar. 6. No. 10.

*Primary Examiner*—Archene Turner
*Attorney, Agent, or Firm*—Millen, White, Zelano, & Branigan, P.C.

[57] ABSTRACT

An article of manufacture comprising a glass substrate having a thermal expansion of less than $5.0 \cdot 10^{-6}/K$ and, coated thereon, a lead- and cadmium-free glaze comprising, in percent by weight, the following components:

| | |
|---|---|
| $Li_2O$ | 0–12 |
| $MgO$ | 0–10 |
| $CaO$ | 3–18 |
| $B_2O_3$ | 5–25 |
| $Al_2O_3$ | 3–18 |
| $Na_2O$ | 3–18 |
| $K_2O$ | 3–18 |
| $BaO$ | 0–12 |
| $SiO_2$ | 25–55 |
| $TiO_2$ | 0–5 |
| $ZrO_2$ | 0–<3 | with up to 30% by weight of a pigment stable at the baking temperature.

25 Claims, No Drawings

LEAD-AND CADMIUM-FREE GLASS COMPOSITION FOR GLAZING, ENAMELING AND DECORATING GLASS

CROSS-REFERENCE TO RELATED APPLICATION

This application is a continuation of application Ser. No. 08/029,364, filed Mar. 22, 1993 now abandoned which application is a continuation-in-part of application Ser. No. 08/002,351, filed Jan. 21, 1993 now abandoned.

BACKGROUND OF THE INVENTION

This invention relates to lead- and cadmium-free glass compositions for glazing, enameling and decorating, particularly for use on glass ceramics and glasses having a low thermal expansion, e.g., borosilicate glasses, and the articles made therefrom.

The primary application for such glasses or glass ceramics are the production of laboratory appliances and cooking utensils resistant to temperature fluctuations, and especially for heatable plates, such as, for example, cooking surfaces.

Glazes are low-melting glasses utilized for protection, enhancement and/or alteration of the physical or chemical surface properties, for embedding, e.g., in electronics, or also simply for adornment and decoration of a great variety of glass articles, glass ceramic, ceramic, or porcelain.

Glazes usually consist of a transparent or translucent glass composition applied to the article in accordance with the conventional techniques, such as, for example, screen printing or brush application, in finely divided form, e.g, in the form of a paste. The finely ground glass powder is frequently also called frit.

Enamels are glazes containing coloring components, such as pigments; the pigment proportion in the enamel can amount to up to 30% by weight.

Pigments usually are oxides resistant with respect to the glaze, evoking the desired color impression in dependence on choice.

The glaze or the enamel is fired in at temperatures lying below the softening point of the article to be treated, the respective glass composition of the glaze and/or of the enamel being melted and forming a stable bond with the surface of the article.

Firing also serves for volatilization of the organic vehicles utilized as auxiliary agents for the application of the glaze or of the enamel.

In order to ensure an adequate and long-term adhesion of the glaze or enamel after firing and during subsequent practical usage, it is necessary in correspondence with previous theoretical considerations to carefully adapt, in particular, the thermal expansion coefficients of the article to be decorated and of the glaze or enamel to each other. In this connection, it has heretofore been considered desirable according to the state of the art for the glaze to exhibit a lower thermal expansion coefficient than the article to be glazed.

This was supposed to ensure that the glaze or the enamel, during cooling after baking, is exposed to compressive stress and accordingly does not exert on the properties of the support material any negative effects, especially strength-reducing effects.

Problems have been encountered heretofore in the glaze or enamel decoration of borosilicate glasses and, in particular, glass ceramics with low thermal expansion based on β-eucryptite or h-quartz mixed crystals produced by thermal treatment, the so-called ceraming of a suitable starting glass. Such glass ceramics are distinguished by a thermal expansion of $0 \pm 1 \cdot 10^{-6}$/K in a temperature range of between 20° and 700° C.

Considering the thermal stability of these glass types, decorating with glaze or, respectively, enamel must take place at temperatures of below 1000° C.

In glass ceramics, the firing of the glaze or enamel is preferably conducted simultaneously with the ceramic-producing process, as a so-called direct firing step.

The glazes and enamels used heretofore for coating and/or decorating glasses of low thermal expansion coefficients and glass ceramics, in most instances, and even today, still contain lead and frequently, in addition thereto, still cadmium.

The reason for the use of lead and cadmium in glazes is their positive effect on the melting properties, a marked lowering of the melt temperature with simultaneously optimum viscosity characteristics of the glaze or enamel, respectively.

In addition, these glazes or enamels, after direct baking, exhibit adequate adhesive strength with respect to the substrate and well satisfy the requirements posed under practical conditions, even over long periods of use.

This is the more surprising inasmuch as, in contrast to the theoretical demand for approximately the same thermal expansion coefficients between carrier material and glaze or enamel, these lead- and cadmium-containing glass compositions exhibit high thermal expansion coefficients of $5 \cdot 10^{-6}$/K up to even $10 \cdot 10^{6}$/K.

The reason why these high-thermal-expansion glass compositions show adequate adhesion to substrates with having practically no thermal expansion, such as, for example, glass ceramic, is ascribed, insofar as this phenomenon has been understood thus far, especially to these additions of lead and possibly cadmium.

However, in the meantime, unfavorable toxicological effects of these substances on humans and the environment have resulted in a partial or entire prohibition of such lead or cadmium compounds in decorative coatings.

A number of lead-free and cadmium-free products of this type have been proposed, therefore, in the literature.

Thus, it has been known from DE 3,405,708 C2 to provide a lead-free, cadmium-free and zinc-free glass frit composition consisting of the components $Al_2O_3$, $B_2O_3$, $SiO_2$, $LiO_2$, $ZrO_2$, $SnO_2$ and of $La_2O_3$, CaO, SrO, BaO, $Na_2O$ and F, and using same for a colored enamel to decorate articles of glass, glass ceramic and ceramic.

These glass frit compositions exhibit high contents of $B_2O_3$ and, in particular, also $SnO_2$ and/or $La_2O_3$.

Glass frit compositions with such high $B_2O_3$ contents with simultaneously low $SiO_2$ contents are hardly capable of satisfying stringent requirements with regard to chemical resistance, particularly acid resistance.

EP 0 267 154 A1 relates to a lead- and cadmium-free glass frit composition consisting of $Na_2O$, ZnO, $B_2O_3$, $SiO_2$ and optionally of $K_2O$, $Li_2$, CaO, SrO, BaO, $Bi_2O_3$, $Al_2O_3$, $ZrO_2$, $TiO_2$ and $WO_3$.

The glass frit composition contains 4.0–30.0 mol-% of ZnO. Also zinc compounds are considered to be toxic even in small concentrations, though less than those of cadmium, and therefore are not without problems, and thus undesirable, as a substitute for lead. Also, the chemical resistance of glasses having high ZnO contents is frequently unsatisfactory in practical use.

WO 90/15782 discloses a lead-free glass composition with 30–51% by weight of $SiO_2$, 19–50% by weight of $B_2O_3$, 2–20% by weight of $ZrO_2$, up to 14% by weight of $Na_2O$, up to 6% by weight of $K_2O$, up to 19% by weight of ZnO, up to 5% by weight of $Li_2O$, and 2–8 parts of fluorine compounds per 100 parts of the other components of the composition. Here again, lead is primarily substituted by zinc.

EP 0 402 007 A1 relates to a glass composition with 30–70% by weight of $SiO_2$, 10–30% by weight of CaO, 0–20% by weight of ZnO, 3–8% by weight of $MoO_3$, 0–20% by weight of $B_2O_3$, 0–25% by weight of $Al_2O_3$, 0–10% by weight of $K_2O$, 0–10% by weight of $Na_2O$, 0–10% by weight of MgO, 0–15% by weight of BaO, 0–7% by weight of $Li_2O$, 0–10% by weight of PbO, 0–5% by weight of SrO, 0–10% by weight of CeO, 0–0.1% by weight of CoO, and 0–5% by weight of $P_2O_5$.

Here, too, the composition contains possibly up to 20% of ZnO and, in addition, necessarily still at least 3% of $MoO_3$, the alkali resistance of which is inadequate due to the danger of the formation of molybdates. This composition furthermore will require a firing range of considerably above 1000° C.

U.S. Pat. No. 4,970,178 claims a lead-free glass frit having the following components: 5.0–14.0 mol-% of $Na_2O$, 8.0–25.0 mol-% of ZnO, 6.0–13.0 mol-% of $B_2O_3$, 45.0–60.0 mol-% of $SiO_2$, 0–8.0 mol-% of $K_2O$, 0–5.0 mol-% of $Li_2O$, 0–8.0 ml-% of CaO, 0–8.0 mol-% of SrO, 0–9.0 mol-% of BaO, 0–10.0 mol-% of $Bi_2O_3$, 0–4.0 mol-% of $Al_2O_3$, 0–6.0 mol-% of $ZrO_2$, 0–7.0 mol-% of $TiO_2$, 0–1.0 mol-% of $WO_3$.

Also this glass frit necessarily contains ZnO.

EP 0 412 336 A1 discloses a pollutant-free orange-colored decorative paint made up of 15–30% by weight of an orange-colored pigment and 70–85% by weight of a glass frit wherein the frit consists of 35–60% by weight of $SiO_2$, 15–35% by weight of $B_2O_3$, 3–8% by weight of $ZrO_2$, 2–8% by weight of $Al_2O_3$, 10–18% by weight of $Na_2O$ and/or $K_2O$ and 2–6% by weight of $Li_2O$. This frit does not contain any CaO and is baked at 1000° C. onto tiles.

For additional information, attention is directed to Uhman and Kreidl, *Glass, Science and Technology*, vol. 1, Chapter 4, "Glazes and Enamels", K. A. Epples, Academic Press, 1983, pages 301–336.

The respective glass compositions according to the state of the art exhibit various, in part desirable, properties, but do not adequately meet overall stringent requirements.

SUMMARY OF THE INVENTION

Therefore, it is an object of this invention to provide glass compositions free of lead, cadmium and other toxicologically objectionable components such as, e.g., toxicologically unacceptable amounts of zinc and preferably none at all, which nevertheless satisfy overall stringent requirements, i.e., can be processed without any problems within a broad and relatively low temperature range and, moreover, yield glazes and enamels having very good properties regarding adhesive strength, thermal stability, resistance to temperature fluctuations, abrasion resistance, tendency to show abrasion, spotting tendency upon contamination, and chemical resistance to acids and alkalis.

Another object is to provide articles of manufacture based on such a glass composition.

Upon further study of the specification and appended claims, further objects and advantages of this invention will become apparent to those skilled in the art.

According to the present invention, these objects are attained by providing articles of manufacture comprising a glass or glass ceramic substrate having a coefficient of thermal expansion of less than $5.0 \cdot 10^{-6}$/K and coated thereon a glass composition

| $Li_2O$ | 0–12% by weight |
| MgO | 0–10% by weight |

-continued

| CaO | 3–18% by weight |
| $B_2O_3$ | 5–25% by weight |
| $Al_2O_3$ | 3–18% by weight |
| $Na_2O$ | 3–18% by weight |
| $K_2O$ | 3–18% by weight |
| BaO | 0–12% by weight |
| $SiO_2$ | 25–55% by weight |
| $TiO_2$ | 0–5% by weight |
| $ZrO_2$ | 0–<3% by weight |

With glass compositions according to this invention, glazes and enamels can be produced which easily satisfy the stringent requirements for practical use, without employing toxic or environmentally harmful materials.

It has been found surprisingly that these compositions according to the invention exhibit all of the desired properties even without additions of lead, cadmium, zinc, tin, and fluorine compounds.

Without being bound to the mechanism of the invention, it is believed that the CaO proportion which is markedly above the usual content found in glaze compositions of the prior art, in conjunction with the selection and usage quantities of the other components in accordance with this invention, leads to an intensive and positive interaction between the substrate glass and the glaze or enamel during the firing step, and thus to a stress-free and firmly adhering bond over an adequately long time period in practical use.

Superior adhesive strengths have been found with the glass compositions according to this invention in the thus-formed glazes after firing, following quenching tests and in continuous operation at 670° C. Even in cases of relatively large layer thicknesses of the glaze, for example, up to 9 μ, no spalling or peeling tendencies were displayed by the substrate glass, and this holds true even at extreme fluctuating temperature loads over longer periods of time. The thermal stability of the compositions is satisfactory and shows practically no change in color even after 75 hours at 670° C.

With good chemical resistance to acids and alkalis, the glaze compositions according to this invention have high gloss, good abrasion resistance, as well as good scratch resistance in screen and also complete facing applications.

Glazes according to the composition of this invention can also be mixed any time without problems with pigments up to a proportion of 30% by weight and can then be used for the production of colored coatings and/or decorations. The pigments employed are conventional oxide materials resistant to the glass compositions at the firing (baking) temperature.

However, the glaze can also be inherently colored, for example, by the controlled addition of coloring oxides.

The components of the glazing glass are first homogeneously melted and from the thus-formed glass, a glass powder having a grain size of <10 μm, preferably 1–3 μm, is then produced by grinding, especially wet grinding. This powder is then made into a paste with a standard screen printing oil, e.g., one having a pine oil base, and applied according to generally known techniques, e.g., by screen printing, by transfer picture, or brush.

After firing a glaze on a glass of low thermal expansion or a glass ceramic, glaze layers are obtained with a thickness of between 2 and 9 μm. These layers, despite the very large differences in thermal expansion between the glaze or enamel and the substrate glass, show both excellent adhesion and resistance to temperature fluctuations.

In a preferred embodiment, $Li_2O$ on the order of magnitude of 4–10% by weight is added to the glass composition of this invention, and the CaO proportion is increased to 5–15, preferably 10, weight percent.

Both measures improve the melting ability of the glass composition to a marked extent, the increased CaO proportion entirely overcompensating for the slight impairment in chemical resistance incurred by the addition of $Li_2O$.

Other preferred embodiments contain, depending on the subsequent purpose of use, also additionally, for example, 8–12% by weight of BaO and/or, for instance, 6–10% by weight of MgO. Such compositions exhibit adhesive strength combined with better chemical resistance to acids and alkalis.

The optional addition of various functional oxides proves advantageous, depending on the usage of the glass composition, where higher $Li_2O$ contents generally entail a lowering of the firing temperature. BaO can serve as a replacement for CaO up to a certain proportion, but this usually brings about an increase in the firing temperature and thermal expansion.

Additions of $TiO_2$ improve acid resistance while $ZrO_2$ can further improve the resistance to alkalis.

The following Table A sets forth preferred embodiments of the glass composition.

| Density | 2.23 g/cm$^3$ |
|---|---|
| Linear thermal expansion | 3.2–3.3 · 10$^{-6}$/K |
| Modulus of elasticity | 6 · 10$^4$ N/mm$^2$ |
| Tensile strength (fire polished) | = 90 N/mm$^2$ |
| Calculated continuous load factor | 6 N/mm$^2$ |
| Refractive index ($n_D$) | 1.473 |
| Electrical volume resistance at 250° C. | 10$^8$ ∩ cm |
| Transformation temperature (Tg) | 530° C. |
| Softening point | 815° C. |
| Chemical resistance: | water, according to DIN 12 111 (5 classes): 1 |
| | acids, according to DIN 12 116 (4 classes): 1 |
| | alkalis, according to DIN 52 322 (3 classes): 2 |

TABLE A

| | 1 (% by wt.) | 2 (% by wt.) | 3 (% by wt.) | 4 (% by wt.) | 5 (% by wt.) | 6 (% by wt.) | 7 (% by wt.) |
|---|---|---|---|---|---|---|---|
| $Li_2O$ | 4–10 | 8–12 | 8–12 | 8–12 | 8–12 | 4–8 | 4–8 |
| MgO | 0–8 | 0–3 | 6–10 | 0–3 | 0–3 | 0–5 | 0–3 |
| CaO | 5–15 | 5–10 | 5–10 | 5–10 | 10–15 | 5–10 | 10–15 |
| $B_2O_3$ | 10–20 | 5–13 | 15–20 | 5–13 | 5–13 | 5–13 | 15–20 |
| $Al_2O_3$ | 5–15 | 5–10 | 5–10 | 10–15 | 10–15 | 5–10 | 5–10 |
| $Na_2O$ | 5–15 | 5–10 | 5–10 | 5–10 | 5–10 | 5–10 | 5–10 |
| $K_2O$ | 5–15 | 5–10 | 10–15 | 5–10 | 5–10 | 5–10 | 5–10 |
| BaO | 0–10 | 8–12 | 0–5 | 0–5 | 0–5 | 8–12 | 0–5 |
| $SiO_2$ | 30–50 | 45–55 | 30–40 | 45–55 | 35–45 | 40–50 | 40–50 |
| $TiO_2$ | 0–5 | 0–5 | 0–5 | 0–5 | 0–5 | 0–5 | 0–5 |
| $ZrO_2$ | 0–<3 | 0–<3 | 0–<3 | 0–<3 | 0–<3 | 0–<3 | 0–<3 |

Substrates

The substrates of this invention constitute glass ceramics or glass, preferably borosilicate glass, having a thermal expansion of less than 5.10·10$^{-6}$.

Borosilicate Glass Substrates

Silicate glasses containing boric oxide comprise the group of borosilicate glass. These glasses have a relatively high percentage of silica, e.g., 70–80% $SiO_2$. The rest of the composition is as follows: 7–13% boric oxide ($B_2O_3$), 4–8% $Na_2O$ and $K_2O$, and 2–7% aluminum oxide ($Al_2O_3$). Glasses having such a composition possess a high resistance to chemical corrosion and temperature change. For this reason, they are used in process plants in the chemical industry, in laboratories, as ampoules and medicine bottles in the pharmaceutical industry, and as envelopes for high intensity lamps. Borosilicate glasses are also used in the home; baking and casserole dishes and other heat-resistant items can be made therefrom.

The family of borosilicate glasses is extraordinarily broad, depending on how the boron compounds within the glass melt interact with the other constituents.

Technical data for and the physical and chemical properties of the main representative of this group, the Schott glass Duran™ (Pyrex™ has almost identical behavior) are as follows:

Other examples of borosilicate glasses:

| Manufacturer | Schott | Schott | Schott | Osram | Corning |
|---|---|---|---|---|---|
| Code No. | 8487 | 2877 | 8250 | 713 | 7251 |
| Tg (°C.) | 523 | 565 | 495 | 530 | 543 |
| Coefficient of thermal expansion α20–300° C. (10$^{-6}$/K) | 4.0 | 4.9 | 5.0 | 4.4 | 3.7 |
| Density | 2.25 | 2.4 | 2.28 | 2.27 | 2.26 |
| Composition: | | | | | |
| $SiO_2$ | 75.1 | 75.6 | 68.7 | 72.9 | 78 |
| $Al_2O_3$ | 1.3 | 4.5 | 3.0 | 4.5 | 2 |
| $B_2O_3$ | 16.7 | 8.8 | 18.6 | 14.5 | 15 |
| $Na_2O$ | 4.3 | 6.6 | 0.8 | 3.5 | 5 |
| $K_2O$ | 1.4 | — | 7.5 | 2.4 | — |
| MgO | 0.4 | — | — | — | — |
| CaO | 0.7 | 0.3 | — | — | — |
| BaO | — | 3.9 | — | 1.2 | — |
| $Li_2O$ | — | — | 0.6 | — | — |
| ZnO | — | — | 0.6 | — | — |

In addition to being almost insensitive to temperature shock, the borosilicate glasses exhibit the following advantageous qualities:

will not deform until approaching 550° C., no gel layer formation on the surface (and, hence, low resistance to flow and little tendency to separate), yields no metals when in contact with liquids, does not act as a catalyst, and is resistant to radioactive radiation.

As a "long glass", it is suitable for hot processing, even for complicated component shapes and apparatus.

Glass Ceramic Substrates

All glasses are in a supercooled state when cooled below the melting point of crystals which have the same chemical composition. Crystallization (devitrification) does not occur because crystalline growth, which is controlled by the diffusion of the components, is too slow as a result of the rapidly increasing viscosity of glass due to falling temperatures or because the number of nuclei, from which crystallites can be formed, is too small.

In glass ceramics, on the other hand, crystalline growth is deliberately stimulated in suitable glass systems to obtain materials with special properties.

The starting point is a glass melt from which the desired items are formed by pressing, blowing, or casting. During a subsequent heat treatment which follows a prescribed temperature-time curve, submicroscopic crystallites begin to form. The addition of high melting point materials (usually $TiO_2$ and $ZrO_2$) to the melt is necessary.

When they precipitate, they act as nucleators and set the crystallization in motion. In doing this, it is important that the temperature zone of nucleation be below the temperature zone of the maximum crystalline growth rate. The glass cannot then crystallize when the melt is cooled, as long as there still are no nuclei. Only after a sufficient number of nuclei have formed can minute crystallites be formed in large quantities by reheating. The percentage of crystals by volume is between 50% and 90%, depending on the qualities desired.

Glass ceramics have technical importance in that their characteristics are determined not only by their glass content, but also by the types of crystals they contain.

Some systems which have crystalline phases with very low or even negative thermal expansion (lithium-aluminosilicates) are very important. They form materials with near-zero expansion over a wide temperature range, maintain their shape up to 800° C., and are totally insensitive to thermal shock. They are used for stove panels (Ceran, Schott), cookware (Pyroflam, Corning), fireplace window glass (Robax, Schott), mirror substrates for telescopes (Zerodur, Schott), length standards, etc.

In another group of glass ceramics, the components of which are Si, Al, Mg, K, F, and O, micalike crystals appear during the production process. They exhibit a low degree of brittleness and allow the glass ceramic to be machined on lathes (Macor, Corning).

For further details concerning the range of components for the glass ceramic, attention is directed to the literature, for example, EP 0 220 333 B1 (page 708).

The general geometric dimensions of the glass substrates that are of particular interest in this invention are on the order of 500×500×4 mm, e.g., 480×500×4 mm.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degree Celsius; and, unless otherwise indicated, all parts and percentages are by weight.

Table I contains the compositions of Examples 1–17 of the glazes according to this invention in percent by weight, based on the oxide:

TABLE I

| No. | 1 | 2 | 3 | 4 | 5 | 6 |
|---|---|---|---|---|---|---|
| $Li_2O$ | 10.0 | 4.0 | 10.0 | 4.0 | 4.0 | 4.0 |
| $B_2O_3$ | 10.0 | 20.0 | 12.0 | 10.0 | 10.0 | 10.0 |
| $Na_2O$ | 5.0 | 15.0 | 5.0 | 5.0 | 15.0 | 5.0 |
| MgO | 0.0 | 0.0 | 8.0 | 6.0 | 0.0 | 8.0 |
| $Al_2O_3$ | 5.0 | 5.0 | 15.0 | 15.0 | 15.0 | 5.0 |
| $SiO_2$ | 50.0 | 30.0 | 30.0 | 30.0 | 46.0 | 48.0 |
| $K_2O$ | 5.0 | 15.0 | 5.0 | 15.0 | 5.0 | 15.0 |
| CaO | 5.0 | 11.0 | 15.0 | 5.0 | 5.0 | 5.0 |
| BaO | 10.0 | 0.0 | 0.0 | 10.0 | 0.0 | 0.0 |

| No. | 7 | 8 | 9 | 10 | 11 | 12 |
|---|---|---|---|---|---|---|
| $Li_2O$ | 4.0 | 10.0 | 4.0 | 10.0 | 10.0 | 10.0 |
| $B_2O_3$ | 10.0 | 20.0 | 20.0 | 20.0 | 20.0 | 10.0 |
| $Na_2O$ | 15.0 | 15.0 | 5.0 | 5.0 | 5.0 | 5.0 |
| MgO | 8.0 | 8.0 | 0.0 | 0.0 | 8.0 | 0.0 |
| $Al_2O_3$ | 5.0 | 7.0 | 5.0 | 15.0 | 5.0 | 15.0 |
| $SiO_2$ | 30.0 | 30.0 | 46.0 | 30.0 | 32.0 | 30.0 |
| $K_2O$ | 5.0 | 5.0 | 5.0 | 5.0 | 15.0 | 15.0 |
| CaO | 13.0 | 5.0 | 15.0 | 5.0 | 5.0 | 15.0 |
| BaO | 10.0 | 0.0 | 0.0 | 10.0 | 0.0 | 0.0 |

| No. | 13 | 14 | 15 | 16 | 17 |
|---|---|---|---|---|---|
| $Li_2O$ | 4.0 | 10.0 | 10.0 | 9.4 | 6.4 |
| $B_2O_3$ | 20.0 | 10.0 | 11.3 | 10.0 | 10.0 |
| $Na_2O$ | 5.0 | 15.0 | 6.8 | 5.0 | 7.6 |
| MgO | 6.0 | 0.0 | 0.0 | 0.0 | 3.3 |
| $Al_2O_3$ | 5.0 | 5.0 | 12.8 | 11.4 | 7.6 |
| $SiO_2$ | 30.0 | 30.0 | 49.1 | 41.7 | 45.1 |
| $K_2O$ | 5.0 | 15.0 | 5.0 | 5.0 | 5.0 |
| CaO | 15.0 | 5.0 | 5.0 | 15.0 | 5.0 |
| BaO | 10.0 | 10.0 | 0.0 | 2.5 | 10.0 |

Table II shows, for the compositions 1–17 of Table I, in each case the transition temperature (Tg) in ° C., the softening temperature (ST) in ° C., the processing temperature (PT) in ° C., as well as the thermal expansion coefficient (CTE) between 20° and 300° C. in $10^{-6}$/K.

TABLE II

| No. | Tg | ST | PT | CTE |
|---|---|---|---|---|
| 1 | 454 | 567 | 690 | 10.18 |
| 2 | 374 | 469 | 596 | 14.49 |
| 3 | 433 | 533 | 840 | 11.41 |
| 4 | 382 | 495 | 830 | 12.38 |
| 5 | 444 | 557 | 750 | 11.50 |
| 6 | 447 | 568 | 756 | 10.98 |
| 7 | 374 | 490 | 700 | 13.62 |
| 8 | 365 | 447 | 597 | 13.65 |
| 9 | 511 | 610 | 765 | 9.20 |
| 10 | 422 | 513 | 639 | 10.83 |
| 11 | 378 | 456 | 630 | 13.13 |
| 12 | 385 | 515 | 755 | 12.60 |
| 13 | 466 | 567 | 689 | 10.51 |
| 14 | 300 | 400 | 430 | 16.40 |
| 15 | 435 | 537 | 780 | 11.02 |
| 16 | 432 | 531 | 750 | 11.48 |
| 17 | 436 | 543 | 705 | 11.14 |

Especially preferred examples according to this invention herein are Compositions 1, 11, 15, 16, and 17, with transition temperatures in the range of from 380°–450° C., softening temperatures in the range of from 460°–570° C., processing temperatures of from 630°–780° C., and thermal expansion coefficients of from 10.18–13.13#$10^{-6}$/K.

These compositions also display very good adhesive strength, high thermal and chemical resistance, and excellent functional properties during the course of the investigations performed according to conventional standard methods, as well as in long-term tests.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An article of manufacture comprising a glass ceramic or glass substrate having a thermal expansion of less than $5.0 \cdot 10^{-6}/K$, and coated thereon a lead- and cadmium-free glaze consisting essentially of, in percent by weight, the following components:

| | |
|---|---|
| $Li_2O$ | 0–12 |
| MgO | 0–10 |
| CaO | 3–18 |
| $B_2O_3$ | 5–25 |
| $Al_2O_3$ | 3–18 |
| $Na_2O$ | 3–18 |
| $K_2O$ | 3–18 |
| BaO | 0–12 |
| $SiO_2$ | 25–55 |
| $TiO_2$ | 0–5 |
| $ZrO_2$ | 0–<3 | with up to 30% by weight of a pigment stable at the baking temperature.

2. An article according to claim 1, wherein the glaze components consist essentially of, in percent by weight:

| | |
|---|---|
| $Li_2O$ | 4–10 |
| MgO | 0–8 |
| CaO | 5–15 |
| $B_2O_3$ | 10–20 |
| $Al_2O_3$ | 5–15 |
| $Na_2O$ | 5–15 |
| $K_2O$ | 5–15 |
| BaO | 0–10 |
| $SiO_2$ | 30–50 |
| $TiO_2$ | 0–5 |
| $ZrO_2$ | 0–<3 | with up to 30% by weight of a pigment stable at the baking temperature.

3. A glass composition, suitable for glazing, enameling and decorating glass ceramics or glasses consisting essentially of, in percent by weight, the following components:

| | |
|---|---|
| $Li_2O$ | 8–12 |
| MgO | 0–3 |
| CaO | 5–10 |
| $B_2O_3$ | 5–13 |
| $Al_2O_3$ | 5–10 |
| $Na_2O$ | 5–10 |
| $K_2O$ | 5–10 |
| BaO | 8–12 |
| $SiO_2$ | 45–55 |
| $TiO_2$ | 0–5 |
| $ZrO_2$ | 0–<3 | with up to 30% by weight of a pigment stable at the baking temperature.

4. A glass composition, suitable for glazing, enameling and decorating glass ceramics or glasses consisting essentially of, in percent by weight, the following components:

| | |
|---|---|
| $Li_2O$ | 8–12 |
| MgO | 6–10 |
| CaO | 5–10 |
| $B_2O_3$ | 15–20 |
| $Al_2O_3$ | 5–10 |
| $Na_2O$ | 5–10 |
| $K_2O$ | 10–15 |
| BaO | 0–5 |
| $SiO_2$ | 30–40 |
| $TiO_2$ | 0–5 |
| $ZrO_2$ | 0–<3 | with up to 30% by weight of a pigment stable at the baking temperature.

5. An article according to claim 1, wherein the glaze components consisting essentially of, in percent by weight:

| | |
|---|---|
| $Li_2O$ | 8–12 |
| MgO | 0–3 |
| CaO | 5–10 |
| $B_2O_3$ | 5–13 |
| $Al_2O_3$ | 10–15 |
| $Na_2O$ | 5–10 |
| $K_2O$ | 5–10 |
| BaO | 0–5 |
| $SiO_2$ | 45–55 |
| $TiO_2$ | 0–5 |
| $ZrO_2$ | 0–<3 | with up to 30% by weight of a pigment stable at the baking temperature.

6. A glass composition, suitable for glazing, enameling and decorating glass ceramics or glasses consisting essentially of, in percent by weight, the following components:

| | |
|---|---|
| $Li_2O$ | 8–12 |
| MgO | 0–3 |
| CaO | 10–15 |
| $B_2O_3$ | 5–13 |
| $Al_2O_3$ | 10–15 |
| $Na_2O$ | 5–10 |
| $K_2O$ | 5–10 |
| BaO | 0–5 |
| $SiO_2$ | 35–45 |
| $TiO_2$ | 0–5 |
| $ZrO_2$ | 0–<3 | with up to 30% by weight of a pigment stable at the baking temperature.

7. A glass composition, suitable for glazing, enameling and decorating glass ceramics or glasses consisting essentially of, in percent by weight, the following components:

| | |
|---|---|
| $Li_2O$ | 4–8 |
| MgO | 0–5 |
| CaO | 5–10 |
| $B_2O_3$ | 5–13 |
| $Al_2O_3$ | 5–10 |
| $Na_2O$ | 5–10 |
| $K_2O$ | 5–10 |
| BaO | 8–12 |
| $SiO_2$ | 40–50 |
| $TiO_2$ | 0–5 |
| $ZrO_2$ | 0–<3 | with up to 30% by weight of a pigment stable at the baking temperature.

8. A glass composition, suitable for glazing, enameling and decorating glasses consisting essentially of, in percent by weight, the following components:

| | |
|---|---|
| Li₂O | 4–8 |
| MgO | 0–3 |
| CaO | 10–15 |
| B₂O₃ | 15–20 |
| Al₂O₃ | 5–10 |
| Na₂O | 5–10 |
| K₂O | 5–10 |
| BaO | 0–5 |
| SiO₂ | 40–50 |
| TiO₂ | 0–5 |
| ZrO₂ | 0–<3 | with up to 30% by weight of a pigment stable at the baking temperature.

9. An article according to claim 1, produced from a glaze composition having a transition temperature of 300° C.–510° C., a softening temperature of 400°–610° C., and a processing temperature of 430°–840° C.

10. An article according to claim 1, said glaze having a thermal expansion coefficient of 9.20 to 16.40·10⁻⁶/K.

11. An article according to claim 1, produced from a glaze composition having a transition temperature of 380°–450° C., a softening temperature of 450°–570° C., and a processing temperature of 630°–780° C.

12. An article according to claim 1, said glaze having a thermal expansion coefficient of 10.18 to 13.13·10⁻⁶/K.

13. An article of manufacture comprising a glass substrate having a thermal expansion of less than 5.0·10⁻⁶/K, and coated thereon a glass composition according to claim 3.

14. An article of manufacture comprising a glass substrate having a thermal expansion of less than 5.0·10⁻⁶/K, and coated thereon a glass composition according to claim 4.

15. An article of manufacture comprising a glass substrate having a thermal expansion of less than 5.0·10⁻⁶/K, and coated thereon a glass composition according to claim 6.

16. An article of manufacture comprising a glass substrate having a thermal expansion of less than 5.0·10⁻⁶/K, and coated thereon a glass composition according to claim 7.

17. An article of manufacture comprising a glass substrate having a thermal expansion of less than 5.0·10⁻⁶/K, and coated thereon a glass composition according to claim 8.

18. An article according to claim 1, in the form of a flat cooking surface.

19. An article according to claim 1, wherein said substrate is a borosilicate glass.

20. An article according to claim 1, wherein said substrate is a glass ceramic.

21. An article according to claim 18, having dimensions on the order of 500×500×4 mm.

22. An article of manufacture comprising a glass ceramic or glass substrate having a thermal expansion of less than 5.0·10⁻⁶/K, and coated thereon a lead- and cadmium-free glaze comprising, in percent by weight, the following components:

| | |
|---|---|
| Li₂O | 0–12 |
| MgO | 0–10 |
| CaO | 3–18 |
| B₂O₃ | 5–25 |
| Al₂O₃ | 3–18 |
| Na₂O | 3–18 |
| K₂O | 3–18 |
| BaO | 0–12 |
| SiO₂ | 25–55 |
| TiO₂ | 0–5 |
| ZrO₂ | 0–<3 | with up to 30% by weight of a pigment stable at the baking temperature, said glaze having a thermal expansion coefficient of 9.20 to 16.40·10⁻⁶/K.

23. An article of manufacture comprising a glass ceramic or glass substrate having a thermal expansion of less than 5.0·10⁻⁶/K, and coated thereon, a lead- and cadmium-free glaze comprising, in percent by weight, the following components:

| | |
|---|---|
| Li₂O | 0–12 |
| MgO | 0–10 |
| CaO | 3–18 |
| B₂O₃ | 5–25 |
| Al₂O₃ | 3–18 |
| Na₂O | 3–18 |
| K₂O | 3–18 |
| BaO | 0–12 |
| SiO₂ | 25–55 |
| TiO₂ | 0–5 |
| ZrO₂ | 0–<3 | with up to 30% by weight of a pigment stable at the baking temperature, said glaze having a thermal expansion coefficient of 10.18 to 13.13·10⁻⁶/K.

24. An article of manufacture comprising a glass ceramic or glass substrate having a thermal expansion of less than 5.0·10⁻⁶/K, and coated thereon with a glaze essentially free of lead, cadmium, zinc, tin, fluorine and molybdenum compounds and comprising, in percent by weight, the following components:

| | |
|---|---|
| Li₂O | 0–12 |
| MgO | 0–10 |
| CaO | 3–18 |
| B₂O₃ | 5–25 |
| Al₂O₃ | 3–18 |
| Na₂O | 3–18 |
| K₂O | 3–18 |
| BaO | 0–12 |
| SiO₂ | 25–55 |
| TiO₂ | 0–5 |
| ZrO₂ | 0–<3 | with up to 30% by weight of a pigment stable at the baking temperature.

25. An article of manufacture comprising a glass ceramic or glass substrate having a thermal expansion of less than 5.0·10⁻⁶/K, and coated thereon with a glaze free of lead, cadmium, zinc, tin, fluorine and molybdenum compounds and comprising, in percent by weight, the following components:

| | |
|---|---|
| Li₂O | 0–12 |
| MgO | 0–10 |
| CaO | 3–18 |
| B₂O₃ | 5–25 |
| Al₂O₃ | 3–18 |
| Na₂O | 3–18 |
| K₂O | 3–18 |
| BaO | 0–12 |
| SiO₂ | 25–55 |
| TiO₂ | 0–5 |
| ZrO₂ | 0–<3 | with up to 30% by weight of a pigment stable at the baking temperature.

\* \* \* \* \*